US011435791B2

(12) United States Patent
Liu et al.

(10) Patent No.: US 11,435,791 B2
(45) Date of Patent: Sep. 6, 2022

(54) DETACHABLE CAGE AND ELECTRONIC APPARATUS CASING THEREWITH

(71) Applicant: Wistron Corporation, New Taipei (TW)

(72) Inventors: Yu-Qing Liu, New Taipei (TW); Qi Liu, New Taipei (TW); Xiu-Jie Liang, New Taipei (TW); Chen-Yang Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/930,263

(22) Filed: Jul. 15, 2020

(65) Prior Publication Data
US 2021/0357004 A1 Nov. 18, 2021

(30) Foreign Application Priority Data

May 18, 2020 (CN) .......................... 202010418751.0

(51) Int. Cl.
*G06F 1/16* (2006.01)
*G06F 1/18* (2006.01)
*G06F 1/20* (2006.01)

(52) U.S. Cl.
CPC .............. *G06F 1/183* (2013.01); *G06F 1/181* (2013.01); *G06F 1/20* (2013.01)

(58) Field of Classification Search
CPC ....................................................... G06F 1/187
See application file for complete search history.

(56) References Cited

U.S. PATENT DOCUMENTS

| 2009/0168243 A1* | 7/2009 | Luo ....................... G11B 33/127 360/133 |
| 2009/0230277 A1* | 9/2009 | Peng .................... G11B 33/124 248/544 |
| 2011/0049319 A1* | 3/2011 | Peng ....................... G06F 1/187 248/309.1 |
| 2012/0218705 A1* | 8/2012 | Huang .................... G06F 1/187 361/679.37 |

FOREIGN PATENT DOCUMENTS

| TW | M443913 U1 | 12/2012 |
| TW | M567945 | 10/2018 |

* cited by examiner

*Primary Examiner* — Jerry Wu
(74) *Attorney, Agent, or Firm* — Winston Hsu

(57) ABSTRACT

A detachable cage includes a cage body, a handle, two holding structures, and a button. The handle is pivotally connected to the cage boy. The two holding structures are disposed on the cage body and the handle respectively and are detachably engaged with each other. The button is movably disposed on the handle. The button is operable to be pressed to push against one of the two holding structures to disengage the two holding structures from each other, so as to allow the handle to rotate outward relative to the cage body. An electronic apparatus casing includes a casing frame and the detachable cage. The casing frame has a bracket. The detachable cage is detachably disposed on the bracket.

13 Claims, 14 Drawing Sheets

DETACHABLE CAGE AND ELECTRONIC APPARATUS CASING THEREWITH

BACKGROUND OF THE INVENTION

1. Field of the Invention

The present invention relates to an electronic apparatus casing, and more particularly to an electronic apparatus casing with a detachable cage.

2. Description of the Prior Art

In recent years, modular design has been widely used. Especially in the information age, electronic products are constantly being updated, and products with modular design are constantly produced. With the faster and faster replacement of server electronic products, modular design has become the first choice for customers. To facilitate replacement, the module is usually carried by a movable cage. The cage is usually equipped with a handle, which is convenient for a user to move the cage. The larger the handle, the more convenient it is for the user to grasp in principle. However, limited by the structural configuration in the server and that the module may include an input/output interface needing to be exposed out for convenience of inspection and connection, it is very limited in space to set the handle adjacent to the input/output interface on the cage is very limited. Furthermore, even if the cage is equipped with the handle, the mechanism for locking the handle will occupy part of space of the cage, making the handle small in size, which is not conducive to the user's grasp.

SUMMARY OF THE INVENTION

An objective of the invention is to provide a detachable cage, of which a handle is structurally integrated with a locking and unlocking mechanism for enlarging the portion of the handle for grasping as much as possible.

A detachable cage of an embodiment according to the invention includes a cage body, a handle, a first holding structure, a second holding structure, and a button. The handle is pivotally connected to the cage body. The first holding structure is disposed on the cage body. The second holding structure is disposed on the handle. The first holding structure and the second holding structure detachably engaged with each other. The button is movably disposed on the handle. The button is operable to be pressed to push against the first holding structure or the second holding structure to disengage the first holding structure and the second holding structure from each other, so as to allow the handle to rotate outward relative to the cage body. Thereby, the handle is structurally integrated with the locking and unlocking mechanism for providing a larger volume for grasping, which is convenient for a user to grasp the handle to push and pull the detachable cage.

Another objective of the invention is to provide an electronic apparatus casing, which includes one like the above detachable cage. The handle of the detachable cage is structurally integrated with the locking and unlocking mechanism for enlarging the portion of the handle for grasping as much as possible.

An electronic apparatus casing of an embodiment according to the invention includes a casing frame and a detachable cage. The casing frame has a bracket. The detachable cage includes a cage body, a handle, a first holding structure, a second holding structure, and a button. The cage body is detachably disposed on the bracket. The handle is pivotally connected to the cage body. The first holding structure is disposed on the cage body. The second holding structure is disposed on the handle. The first holding structure and the second holding structure detachably engaged with each other. The button is movably disposed on the handle. The button is operable to be pressed to push against the first holding structure or the second holding structure to disengage the first holding structure and the second holding structure from each other, so as to allow the handle to rotate outward relative to the cage body. Similarly, the handle is structurally integrated with the locking and unlocking mechanism for providing a larger volume for grasping, which is convenient for a user to grasp the handle to push the detachable cage to the bracket or pull the detachable cage from the bracket.

Compared with the prior art, the electronic apparatus casing of the detachable cage thereof according to the invention structurally integrate the handle with the locking and unlocking mechanism thereof so as to obtain a larger volume for grasping, which can effectively improve the in the prior art that the handle is on the same side as the input/output interface, which limits the volume of the handle and is not conducive to the user to grasp.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
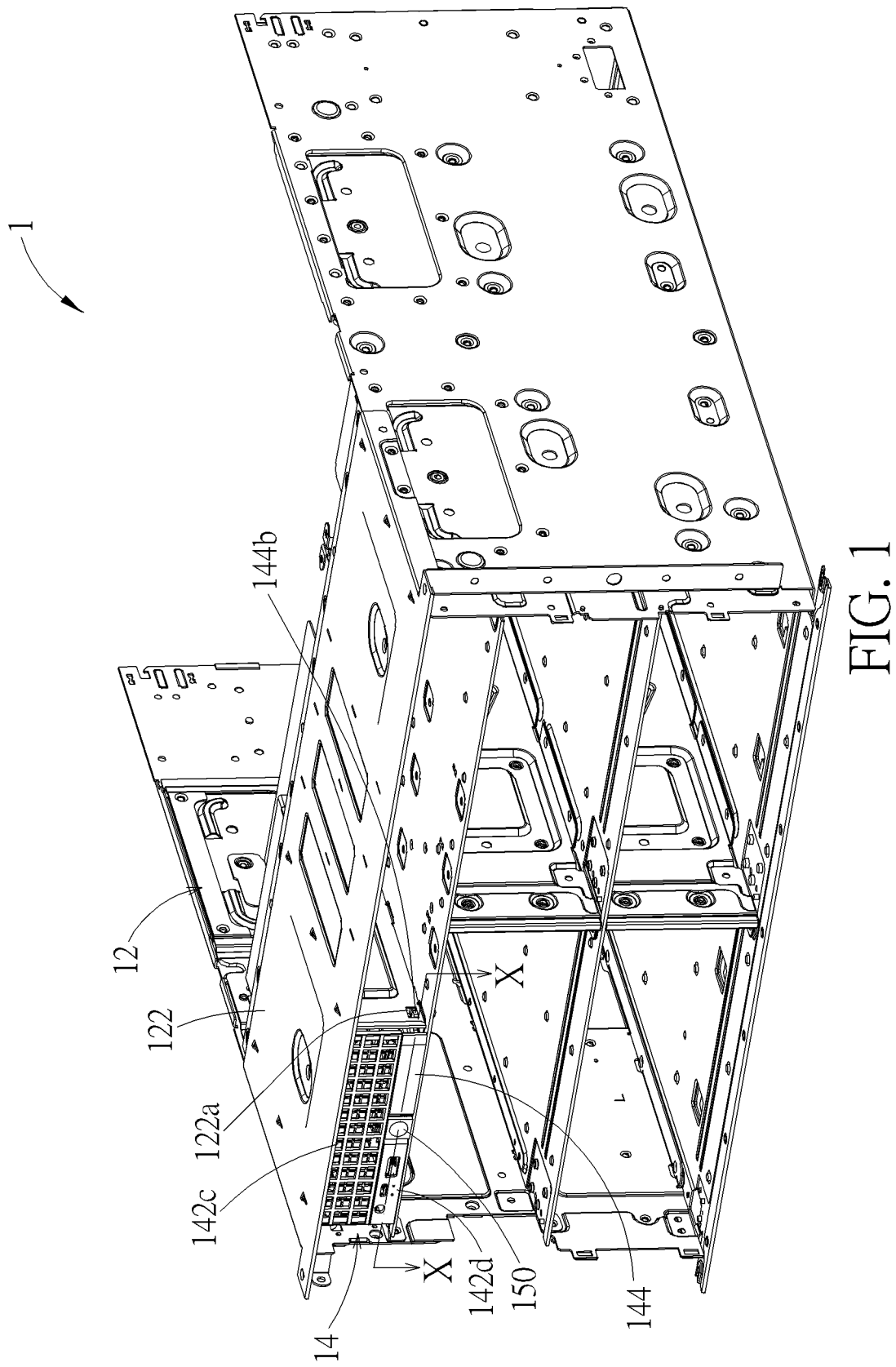
FIG. 1 is a schematic diagram illustrating an electronic apparatus casing according to an embodiment.
Figure 2:
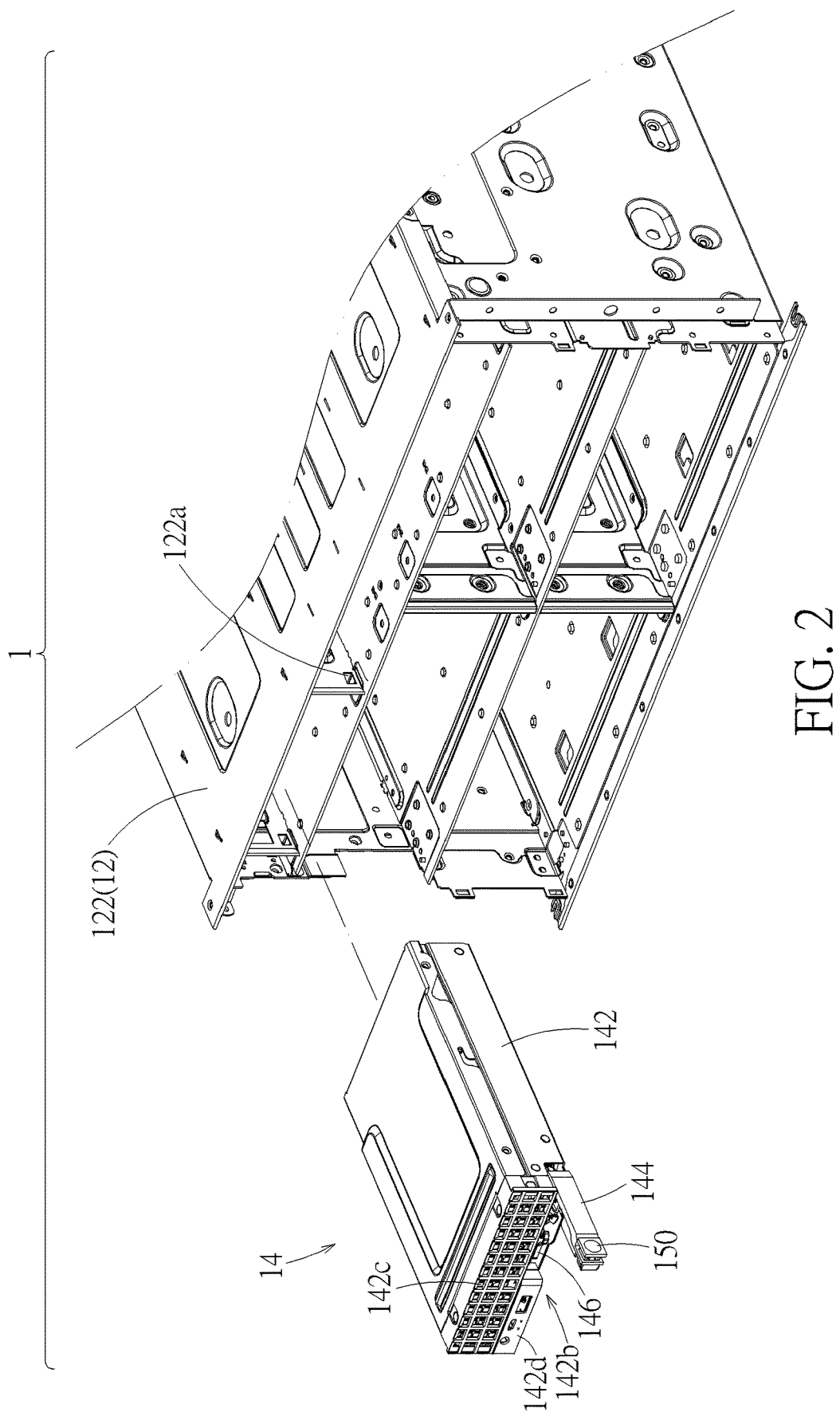
FIG. 2 is a partially exploded view of the electronic apparatus casing in FIG. 1.

Please refer to FIG. 1 and FIG. 2. An electronic apparatus casing 1 according to an embodiment includes a casing frame 12 and a detachable cage 14. In practice, the electronic apparatus casing 1 also includes other structural parts, e.g. an upper cover, a rear cover and so on. For drawing simplification, the electronic apparatus casing 1 is mainly showed by portions thereof relevant to the detachable cage 14. In the embodiment, the casing frame 12 has a bracket 122. The detachable cage 14 is detachably disposed on the bracket 122. In practice, the electronic apparatus casing 1 can be used as but not limited to a server casing, and the detachable cage 14 can be used as but not limited to a storage device, a computing module, or other modular device.

Please also refer to FIG. 3 to FIG. 6. The detachable cage 14 includes a cage body 142, a handle 144, a first holding structure 146, a second holding structure 148, and a button 150. The cage body 142 is detachably disposed on the bracket 122. The handle 144 is pivotally connected to the cage body 142. The first holding structure 146 is disposed on the cage body 142. The second holding structure 148 is disposed on the handle 144. The first holding structure 146 and the second holding structure 148 are detachably engaged with each other. The button 150 is movably disposed on the handle 144. The button 150 is operable to be pressed to push against the first holding structure 146 to disengage the first holding structure 146 and the second holding structure 148 from each other, so that the handle 144 can rotate outward relative to the cage body 142.

Figure 5:
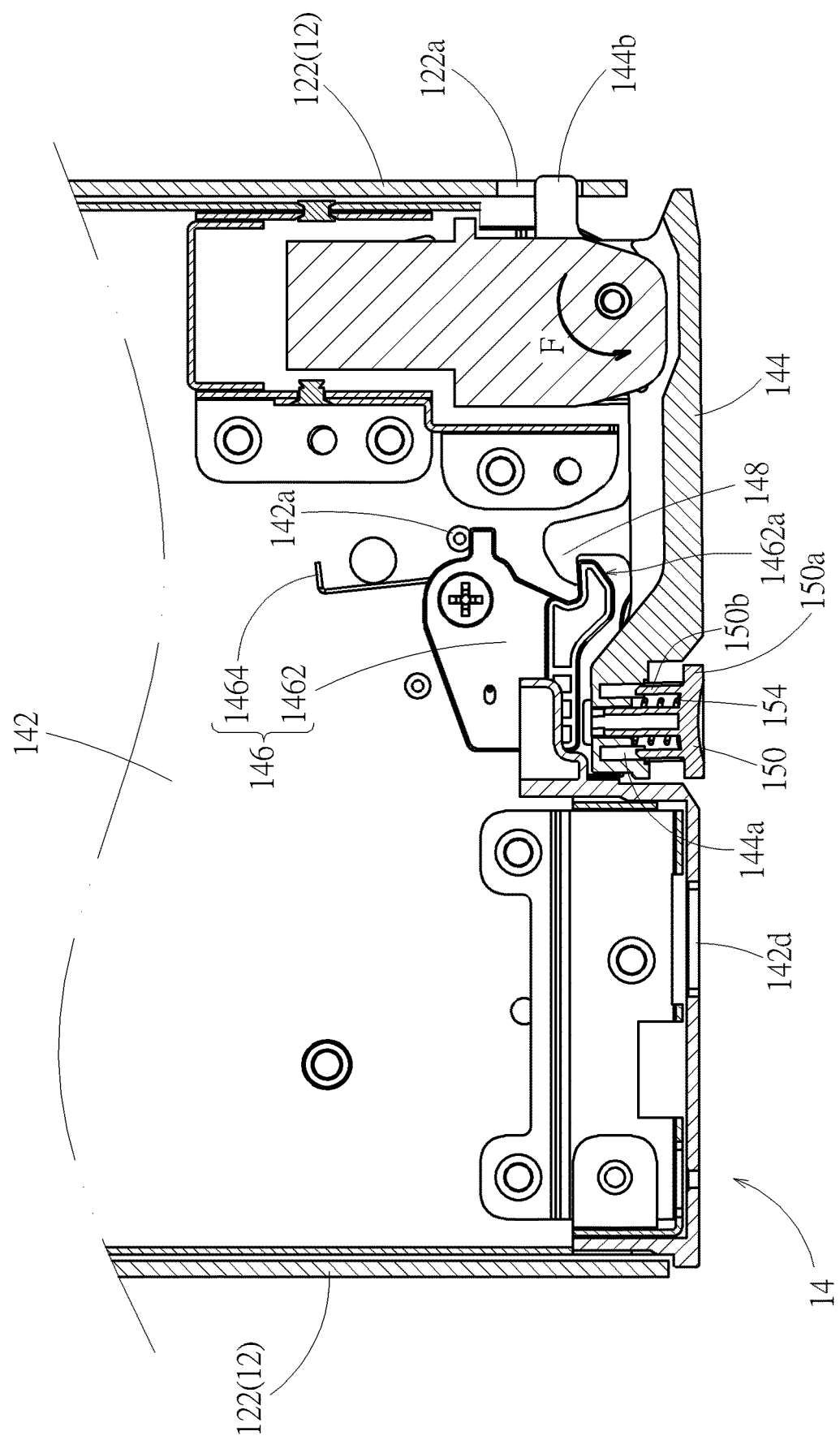
FIG. 5 is a sectional view of a portion of the electronic apparatus casing along the line X-X in FIG. 1.
Figure 6:
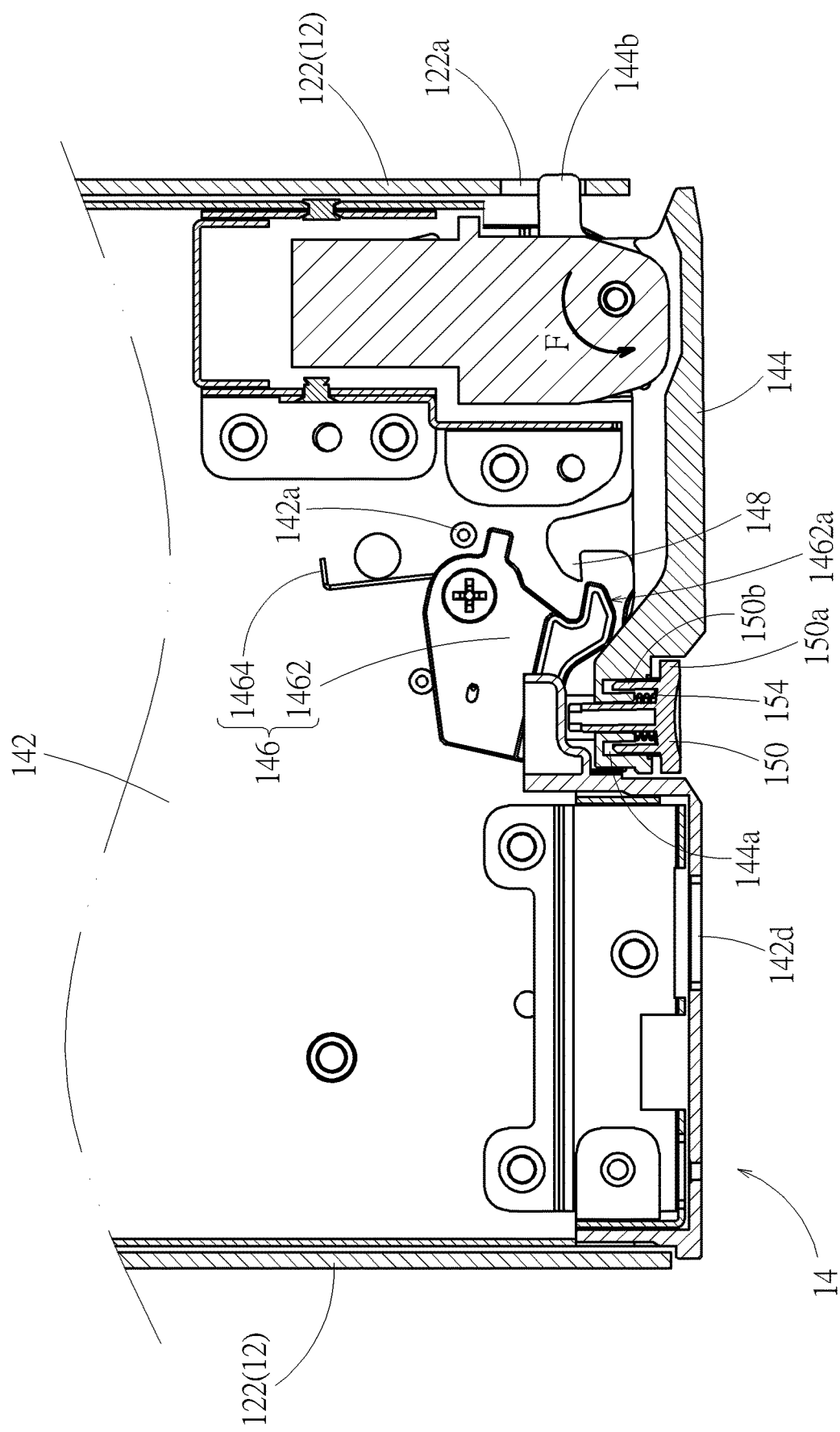
FIG. 6 is a sectional view of the button in FIG. 5 that is pressed to disengage a first holding structure and a second holding structure from each other.

In the embodiment, the first holding structure 146 includes a first holding portion 1462 and a first holding portion restoring structure 1464. The first holding portion 1462 is movably disposed on the cage body 142. The first holding portion restoring structure 1464 is disposed to drive the first holding portion 1462 to return to an original position of the first holding portion 1462. The first holding structure 146 is detachably engaged with the second holding structure 148 through the first holding portion 1462. Therein, the first holding portion 1462 is pivotally connected to the cage body 142. The first holding portion restoring structure 1464 is realized by a torsion spring (of which one end abuts against or is fixed on the first holding portion 1462, of which another end abuts against or is fixed on the cage body 142). Thereby, the first holding portion 1462 is biased by the first holding portion restoring structure 1464 to tend to return to a holding position (as shown by FIG. 5; the first holding portion restoring structure 1464 is blocked by a blocking portion 142a of the cage body 142 to remain at the holding position). The second holding structure 148 is fixedly disposed on the handle 144. A user can move (e.g. press) the button 150 to rotate (e.g. clockwise rotation) the first holding portion 1462 to a detaching position (as shown by FIG. 6), so that the button 150 abuts against the first holding portion 1462 to disengage the first holding portion 1462 and the second holding structure 148 from each other, so as to allow the handle 144 to rotate outward (e.g. counterclockwise) relative to the cage body 142. Afterward, after the button 150 departs from the first holding portion 1462, the first holding portion 1462 returns to the holding position under the action of the first holding portion restoring structure 1464.

Figure 3:
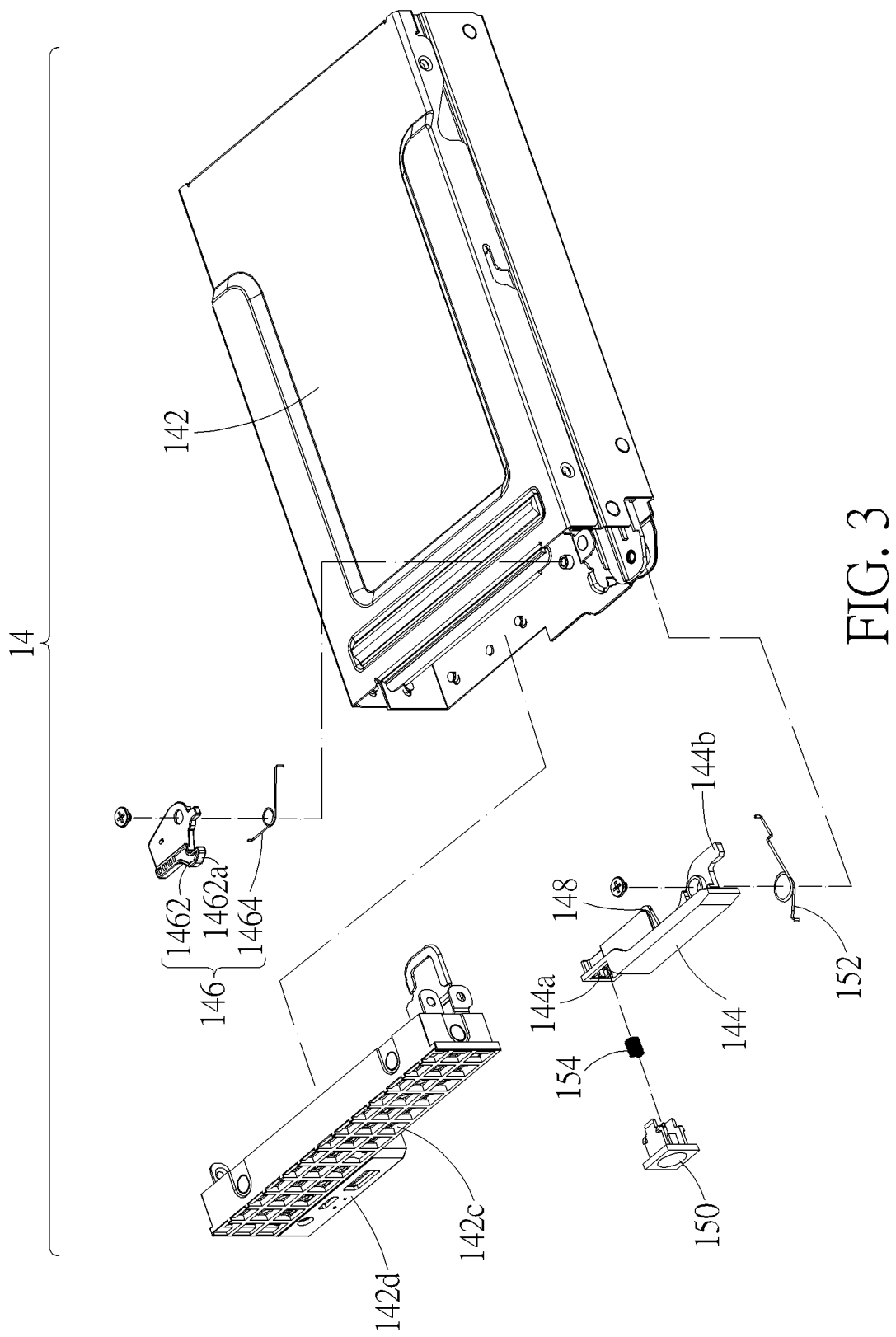
FIG. 3 is a partially exploded view of a detachable cage in FIG. 2.
Figure 4:
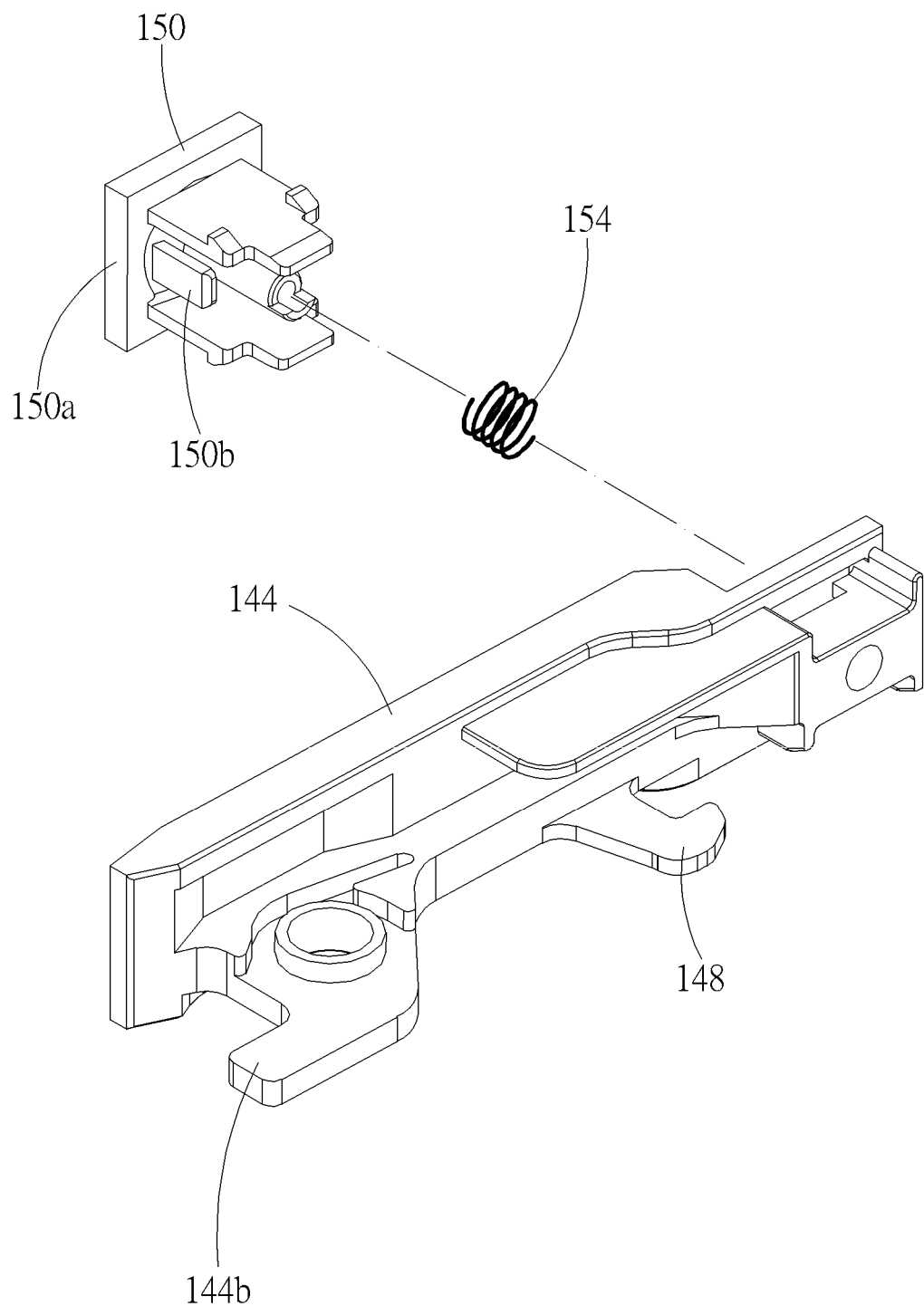
FIG. 4 is an exploded view of a handle and a button in FIG. 3 in another view point.

Furthermore, in the embodiment, the detachable cage 14 further includes a force generating structure 152 (as shown by FIG. 3), disposed to apply a pushing force F (indicated by an arrow in FIG. 5 and FIG. 6) to the handle 144 to drive the handle 144 to rotate outward relative to the cage body 142. Thereby, when the first holding portion 1462 and the second holding structure 148 are disengaged from each other, under the effect of the pushing force F, the handle 144 rotates outward relative to the cage body 142. In the embodiment, the force generating structure 152 is realized by a torsion spring (of which one end abuts against or is fixed on the handle 144, of which another end abuts against or is fixed on the cage body 142). In practice, the force generating structure 152 can be realized by other structure, e.g. an elastic strip. For another example, a spring is used as the force generating structure 152 and abuts against and between the handle 144 and the cage body 142 to drive the handle 144 to rotate outward relative to the cage body 142. For another example, a curved elastic structure extending from the handle 144 (e.g. integrated with the handle 144 through injection) is used as the force generating structure 152 and abuts against the cage body 142 to drive the handle 144 to rotate outward relative to the cage body 142. The handle 144 that is rotated out can be grasped by the user for moving the detachable cage 14 (e.g. pulling from the bracket 122, or inserting from the outside and pushing into the bracket 122).

Furthermore, in the embodiment, the button 150 is slidably disposed in a sliding slot 144a of the handle 144. The detachable cage 14 further includes a button restoring structure 154, which is connected to the button 150 and the handle 144 to drive the button 150 to return to an un-pressed position (as shown by FIG. 5, away from the first holding portion 1462). This structural configuration helps to prevent the button 150 from loosening when the handle 144 is rotated out of the cage body 142. In the embodiment, the button restoring structure 154 is a spiral spring, abutting against and between the button 150 and the handle 144. In practice, the button restoring structure 154 also can be realized by other structure to make the button 150 be capable of elastically moving relative to the handle 144. For example, a spiral elastic structure extending from the handle 144 or the button 150 (integrated with the handle 144 through injection) can be used as the spiral spring. For another example, an elastic arm, of which two ends are connected to the handle 144 and the button 150 respectively so that the combination of the button 150 and the elastic arm shows a cantilever structure relative to the handle 144, can be used as the button restoring structure 154 and elastically move the button 150 relative to the handle 144. In this instance, in practice, the button 150, the elastic arm, and the handle 144 can be formed to be a single part.

Figure 7:
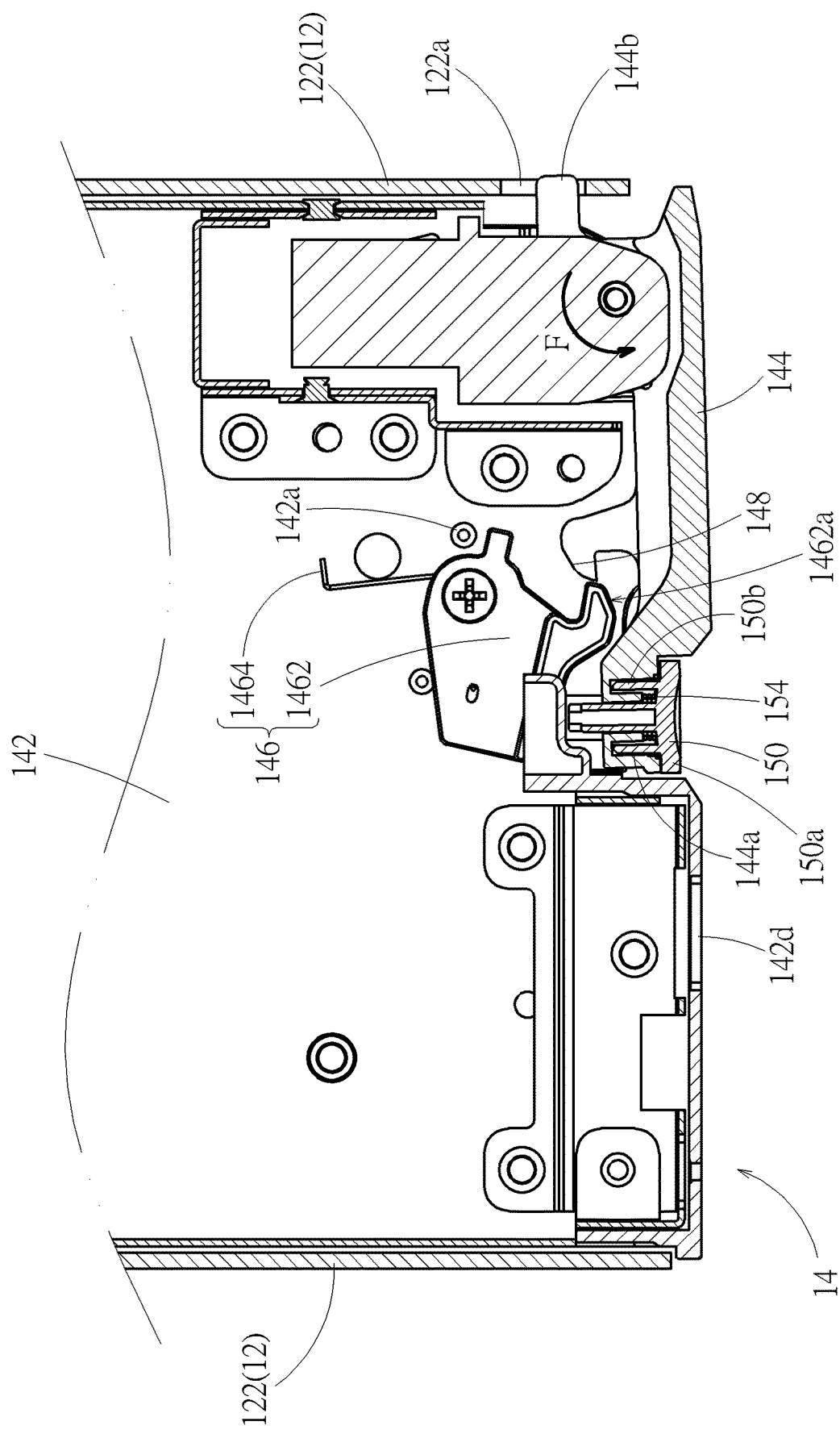
FIG. 7 is a sectional view of the handle in FIG. 6 that is rotated outward at an angle relative to a cage body.
Figure 8:
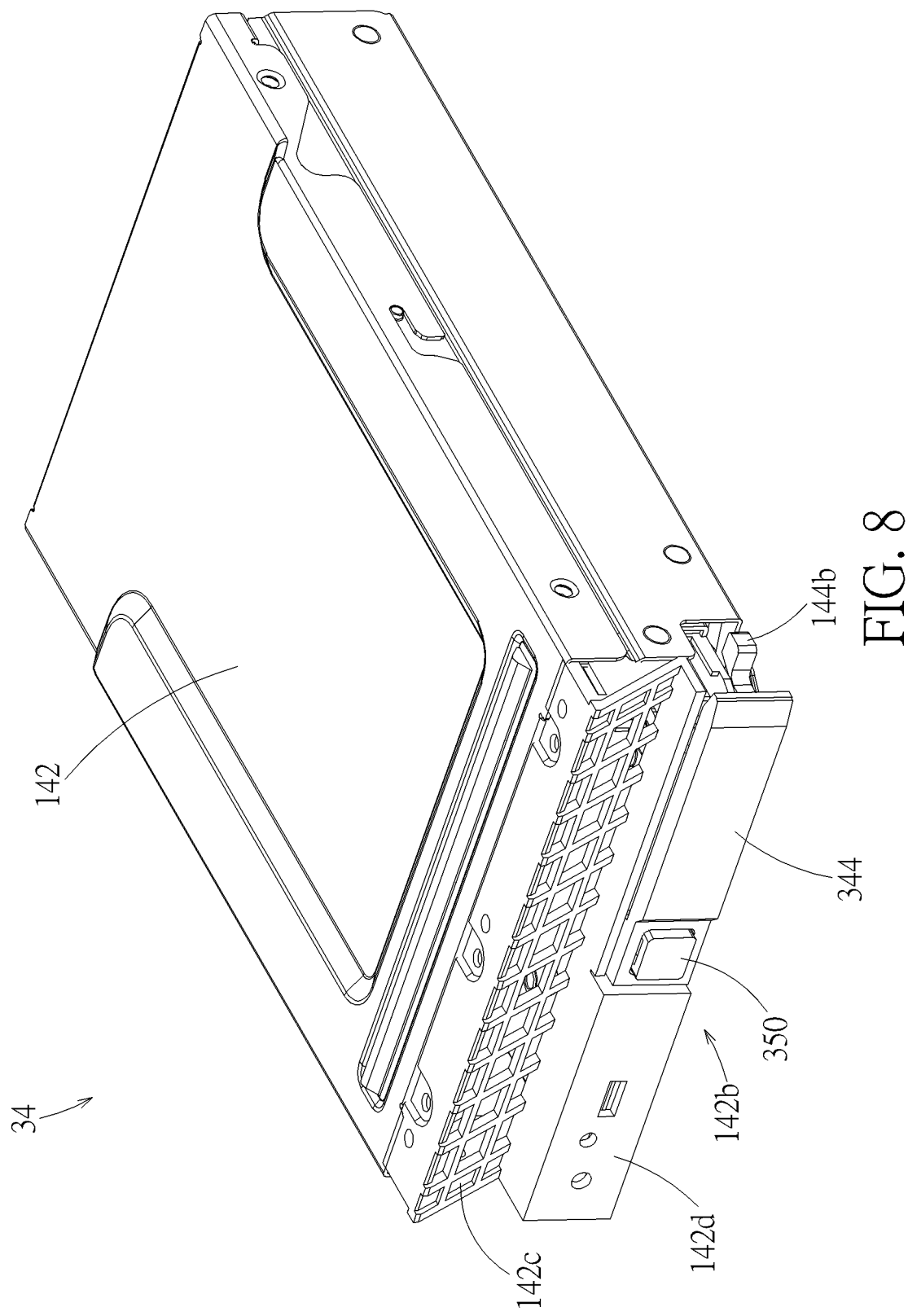
FIG. 8 is a schematic diagram illustrating a detachable cage according to an embodiment.
Figure 9:
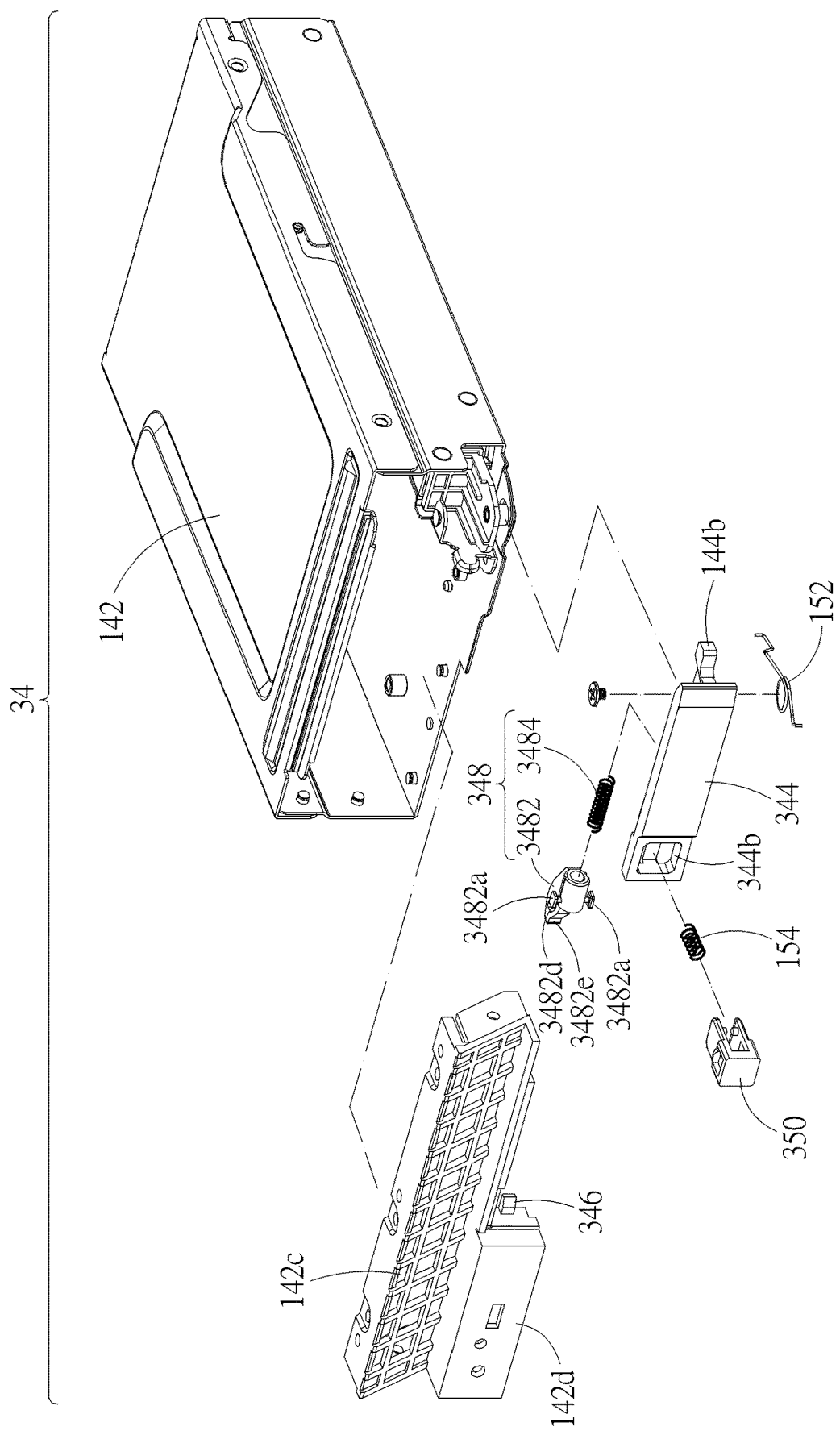
FIG. 9 is a partially exploded view of the detachable cage in FIG. 8.
Figure 10:
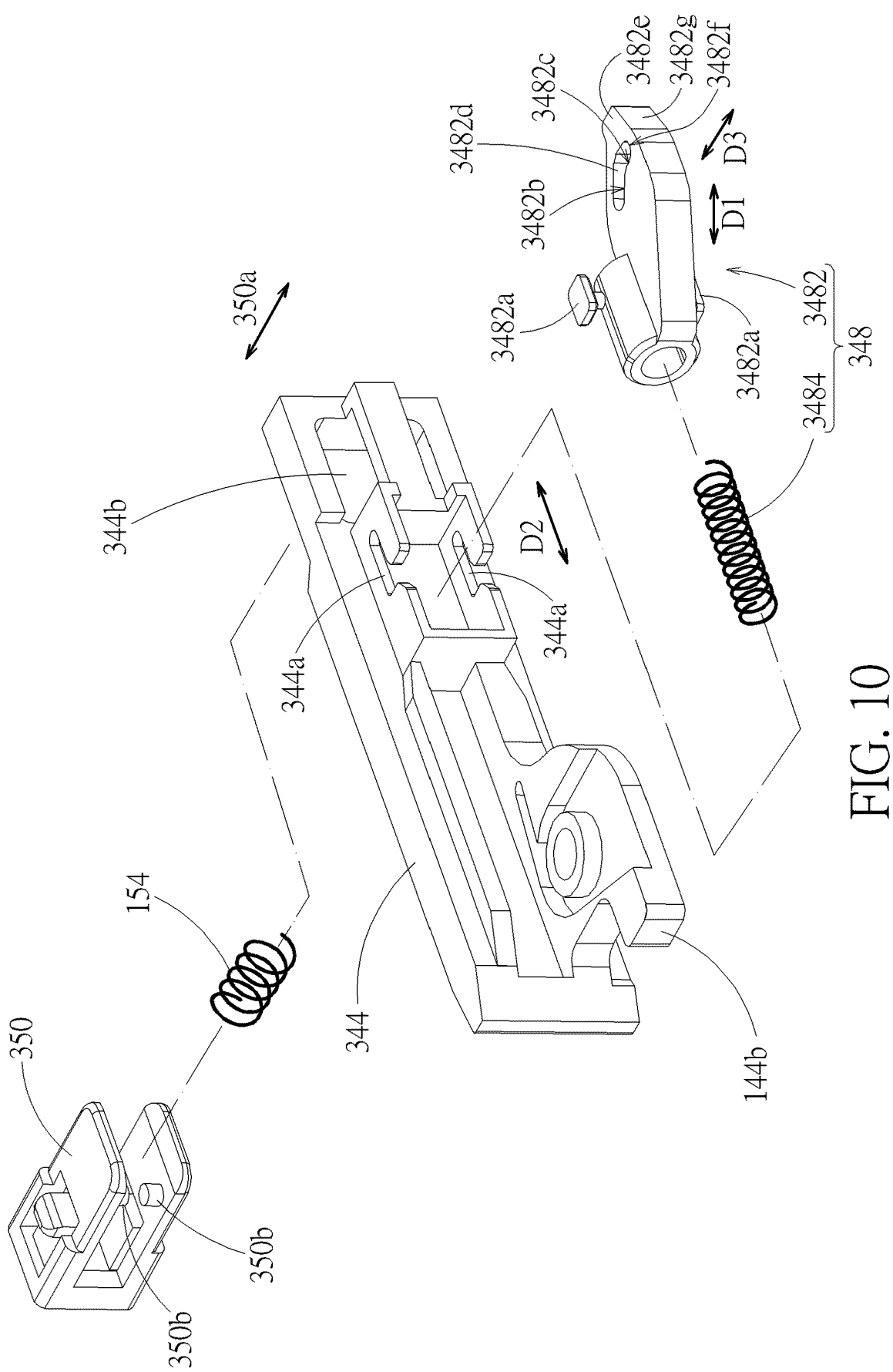
FIG. 10 is an exploded view of a handle, a button, and a second holding structure in FIG. 9 in another view point.
Figure 11:
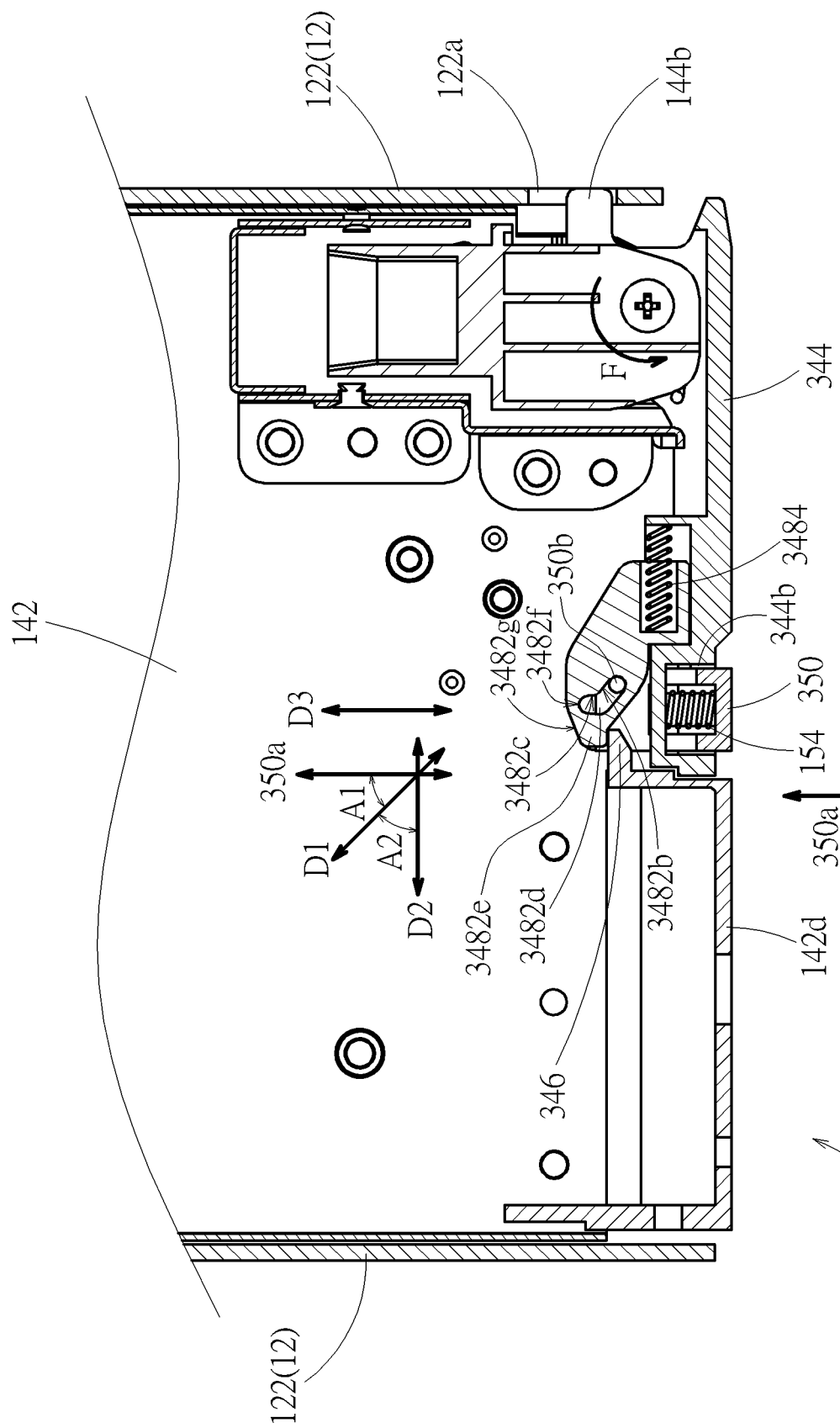
FIG. 11 is a sectional view of a portion of the detachable cage in FIG. 9, of which the position of the cutting plane can refer to the line X-X in FIG. 1.

Please also refer to FIG. 7. When the first holding structure 146 and the second holding structure 148 are engaged with each other (as shown by FIG. 5), the user can press the button 150 with his finger to push against the first holding portion 1462, so as to rotate the first holding portion 1462 to be disengaged from the second holding structure 148, as shown by FIG. 6. At the moment, the button 150 and the handle 144 can slide relative to each other, so under the effect of the pushing force F, the handle 144 and the second holding structure 148 together rotate relative to the button 150 (i.e. rotating counterclockwise relative to the cage body 142) until the handle 144 is stopped, as shown by FIG. 7. At the moment, the handle 144 and the second holding structure 148 together have rotated at least a small angle relative to the cage body 142, so that the button 150 no longer abuts the first holding portion 1462. Besides, under the effect of the first holding portion restoring structure 1464, the first holding portion 1462 will no longer engage with the first holding structure 146. Afterward, after the user removes his finger from the button 150, the button restoring structure 154 will drive the button 150 to return back to its original position, and the first holding portion restoring structure 1464 will drive the first holding portion 1462 to return back to its original position (i.e. the holding position). Then, the handle 144 can easily be rotated away from the cage body 142 (e.g. to the position where the handle 144 is located in FIG. 2) for the user to grasp.

Therein, in the embodiment, when the handle 144 rotates relative to the button 150, the button 150 can use other structures thereof (e.g. in FIG. 5, an edge portion 150a of the portion used for the user's finger to press on, or a limitation portion 150b located in the sliding slot 144a of the handle 144) to stop the handle 144 (as shown by FIG. 7). Furthermore, in actual operation, the finger is usually larger than the button 150, so when the handle 144 rotates relative to the button 150, the finger itself that presses the button 150 can play the role of stopping the handle 144 from continuing rotating. In this case, the above design of using the edge portion 150a or limitation portion 150b of the button 150 to stop the handle 144 from continuing rotating can be omitted. Furthermore, in the embodiment, the button restoring structure 154 is a spiral spring, which can be regarded as a rigid body when fully compressed to be solid (as shown by FIG. 7). The button 150 also can use the compressed button restoring structure 154 to stop the handle 144 from continuing rotating. In this case, the above design of using the edge portion 150a or limitation portion 150b of the button 150 to stop the handle 144 from continuing rotating also can be omitted.

Furthermore, in the embodiment, the first holding portion 1462 (or the portion thereof used for engaging with the second holding structure 148) and the second holding structure 148 are roughly hooked structures. The first holding portion 1462 has a guiding surface 1462a, so that when the handle 144 is rotated toward the cage body 142 (e.g. by the user pressing the handle 144 back toward the cage body 142), the second holding structure 148 can slide on the guiding surface 1462a to make the first holding portion 1462 rotate clockwise to cross over the hooked structure of the first holding portion 1462. Afterward, under the restoring effect of the first holding portion restoring structure 1464, the first holding portion 1462 and the second holding structure 148 engage with each other again.

Furthermore, in the embodiment, the bracket 122 has a lock slot 122a. The handle 144 has a latch 144b, located at another side of the handle 144 opposite to the first holding structure 146 (or the button 150). When the detachable cage 14 (or the cage body 142 thereof) is supported on the bracket 122 and the first holding structure 146 and the second holding structure 148 are engaged with each other, the latch 144b protrudes from the cage body 142 and is inserted into the lock slot 122a so as to prevent the detachable cage 14 (or the cage body 142 thereof) from departing from the bracket 122, as shown by FIG. for FIG. 5. After the first holding structure 146 and the second holding structure 148 disengaged from each other and the handle 144 is rotated outward relative to the cage body 142, the latch 144b does not protrude from the cage body 142, as shown by FIG. 2 or FIG. 6. At the moment, if the detachable cage 14 is supported on the bracket 122, the user can grasp the handle 144 to draw out the detachable cage 14 from the bracket 122.

In addition, as shown by FIG. 2, in the embodiment, the handle 144 is disposed at a front side 142b of the cage body 142. The cage body 142 has a vent structure 142c and an input/output and indication area 142d adjacent to the handle 144. The button 150 and the handle 144 are structurally integrated into an assembly, so as to increase the area, for the user to grasp, within the limited area of the front side 142b of the cage body 142, which also can take aesthetics into account.

As described above, in the detachable cage 14, the first holding structure 146 adopts the design of movable part, and the second holding structure 148 adopts the design of fixed part. However, it is not limited thereto in practice. Please refer to FIG. 8 to FIG. 12. A detachable cage 34 according to another embodiment can replace the above detachable cage 14 to be disposed on the bracket 122 of the casing frame 12. The detachable cage 34 is structurally similar to the detachable cage 14 and uses the reference numbers of the detachable cage 14. For other descriptions about the detachable cage 34, please refer to the relevant descriptions of the detachable cage 14, which will not be described in addition. In the detachable cage 34, a first holding structure 346 thereof is fixed on the cage body 142. A second holding structure 348 thereof is movably disposed on a handle 344 thereof. A button 350 thereof is movably disposed on the handle 344. The button 350 is operable to be pressed to disengage the first holding structure 346 and the second holding structure 348 from each other.

In the embodiment, the second holding structure 348 includes a second holding portion 3482 and a second holding portion restoring structure 3484. The second holding portion 3482 is movably disposed on the handle 344. The second holding portion restoring structure 3484 is disposed to drive the second holding portion 3482 to return back to its original position. The second holding structure 348 is detachably engaged with the first holding structure 346 through the second holding portion 3482. Therein, the second holding portion 3482 is limitedly and slidably disposed on the handle 344 by a pair of sliding blocks 3482a sliding in a pair of guiding sliding slots 344a on the handle 344 respectively. The second holding portion 3482 has a first surface 3482b and a second surface 3482c connected with the first surface 3482b. The button 350 is movably disposed in a sliding slot 344b of the handle 344 along a button sliding direction 350a (indicated by a double-head arrow in the figures). The button restoring structure 154 is also used as the restoring mechanism of the button 350. The button 350 has an abutting portion 350b. The button 350 can be pressed to push against the second holding portion 3482 by the abutting portion 350b sliding on the first surface 3482b or the second surface 3482c, so as to disengage the second holding portion 3482 and the first holding structure 346 from each other. Therein, the button sliding direction 350a and an extension direction D1 (indicated by a double-head arrow in the figures) of the first surface 3482b form an acute angle A1. The extension direction D1 of the first surface 3482b and an extension direction D2 (indicated by a double-head arrow in the figures) of the guiding sliding slot 344a form an acute angle A2. Thereby, the movement of the button 350 along the button sliding direction 350a can drive the second holding portion 3482 to move parallel the extension direction D2. Furthermore, the button sliding direction 350a is parallel to an extension direction D3 (indicated by a double-head arrow in the figures) of the second surface 3482c, so that the sliding of the abutting portion 350b on the second surface 3482c will not induce any movement of the second holding portion 3482 along the extension direction D2, which is conducive to the handle 344 rotating relative to the button 350.

In the embodiment, the second holding portion 3482 uses side surfaces of a sliding slot 3482d thereof as the first surface 3482b and the second surface 3482c. The abutting portion 350b is disposed in the sliding slot 3482d. The sliding slot 3482d can increase the structural constraint on the abutting portion 350b so as to enhance the stability of the linkage between the button 350 and the second holding portion 3482. However, it is not limited thereto in practice. For example, the second holding portion 3482 uses outer structural surfaces as the first surface 3482b and the second surface 3482c. The abutting portion 350b can be kept in abutting against the first surface 3482b and the second surface 3482c by the restoring effect of the second holding portion restoring structure 3484 on the second holding portion 3482, so as to enhance the stability of the linkage between the button 350 and the second holding portion 3482. Furthermore, in the embodiment, the abutting portion 350b is realized by two posts.

In the embodiment, the second holding portion restoring structure 3484 is a spiral spring, abutting against and between the second holding portion 3482 and the handle 344. In practice, the second holding portion restoring structure 3484 can be realized by other structures to make the second holding portion 3482 be capable of elastically moving relative to the handle 344. For example, an elastic spiral structure extending from the handle 344 or the second holding portion 3482 (e.g. integrated with the handle 344 through injection) also can be used as the spiral spring.

Figure 12:
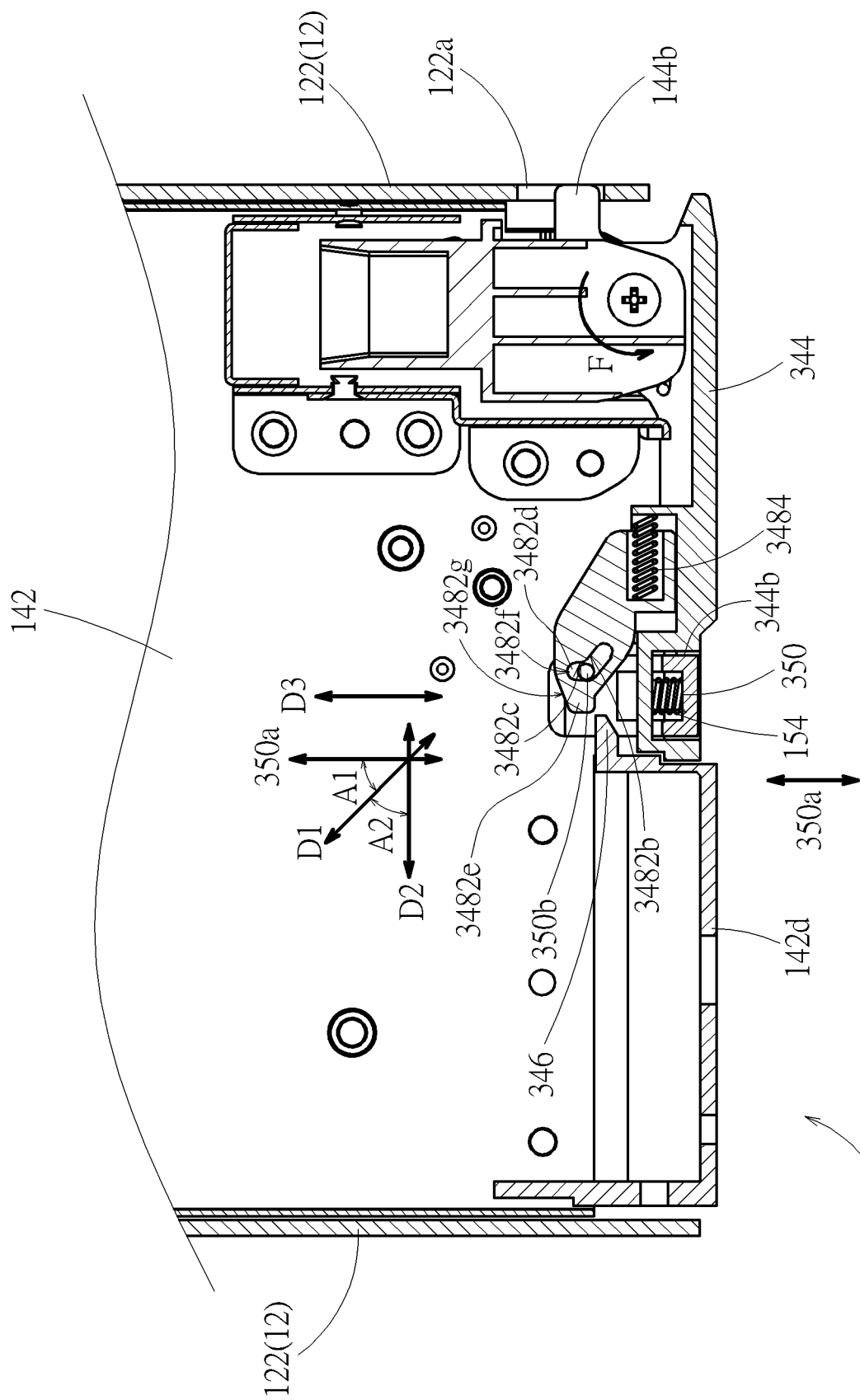
FIG. 12 is a sectional view of the button in FIG. 11 that is pressed to disengage a first holding structure and the second holding structure from each other.
Figure 13:
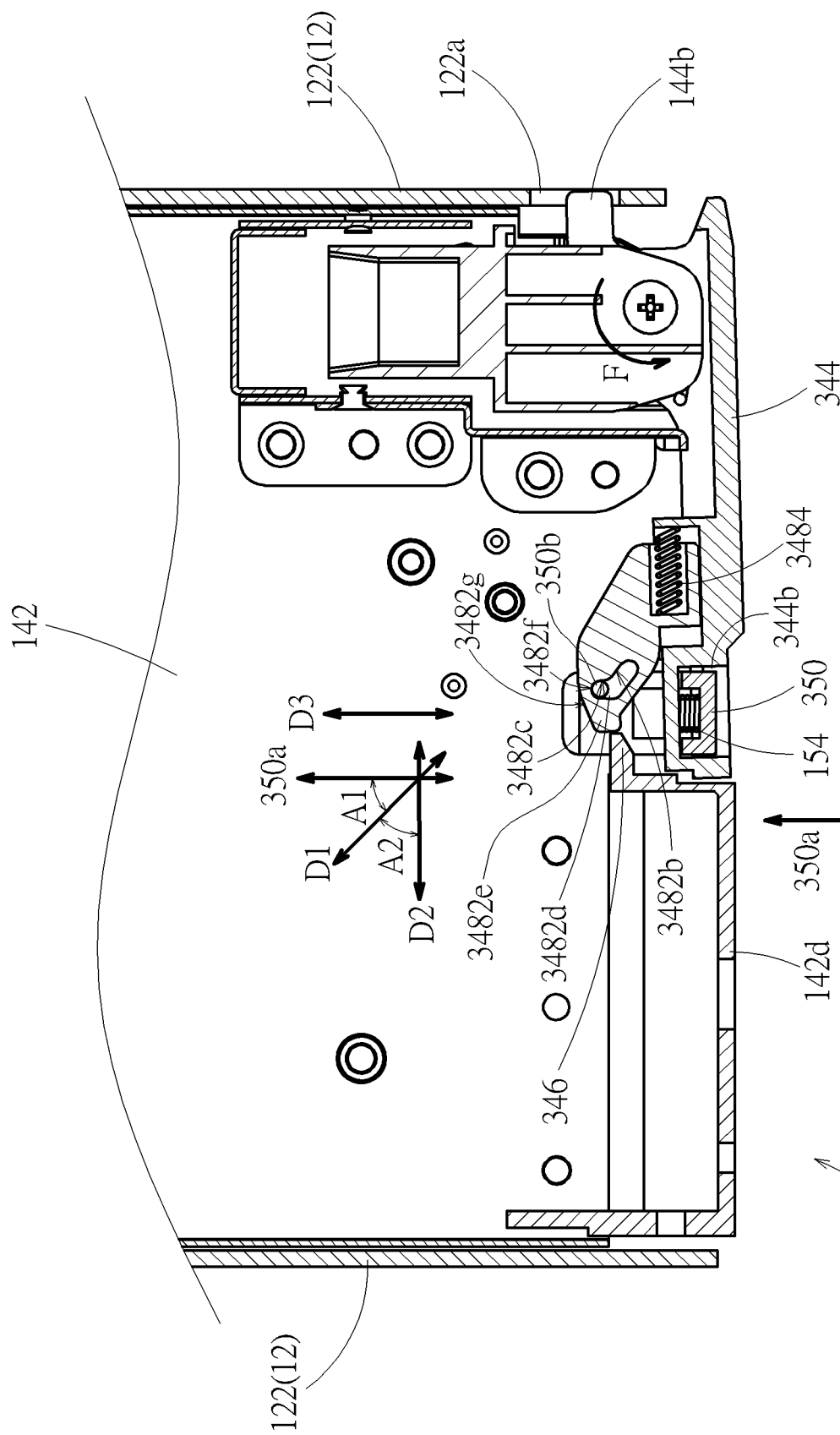
FIG. 13 is a sectional view of the handle in FIG. 12 that is rotated outward at an angle relative to a cage body.
Figure 14:
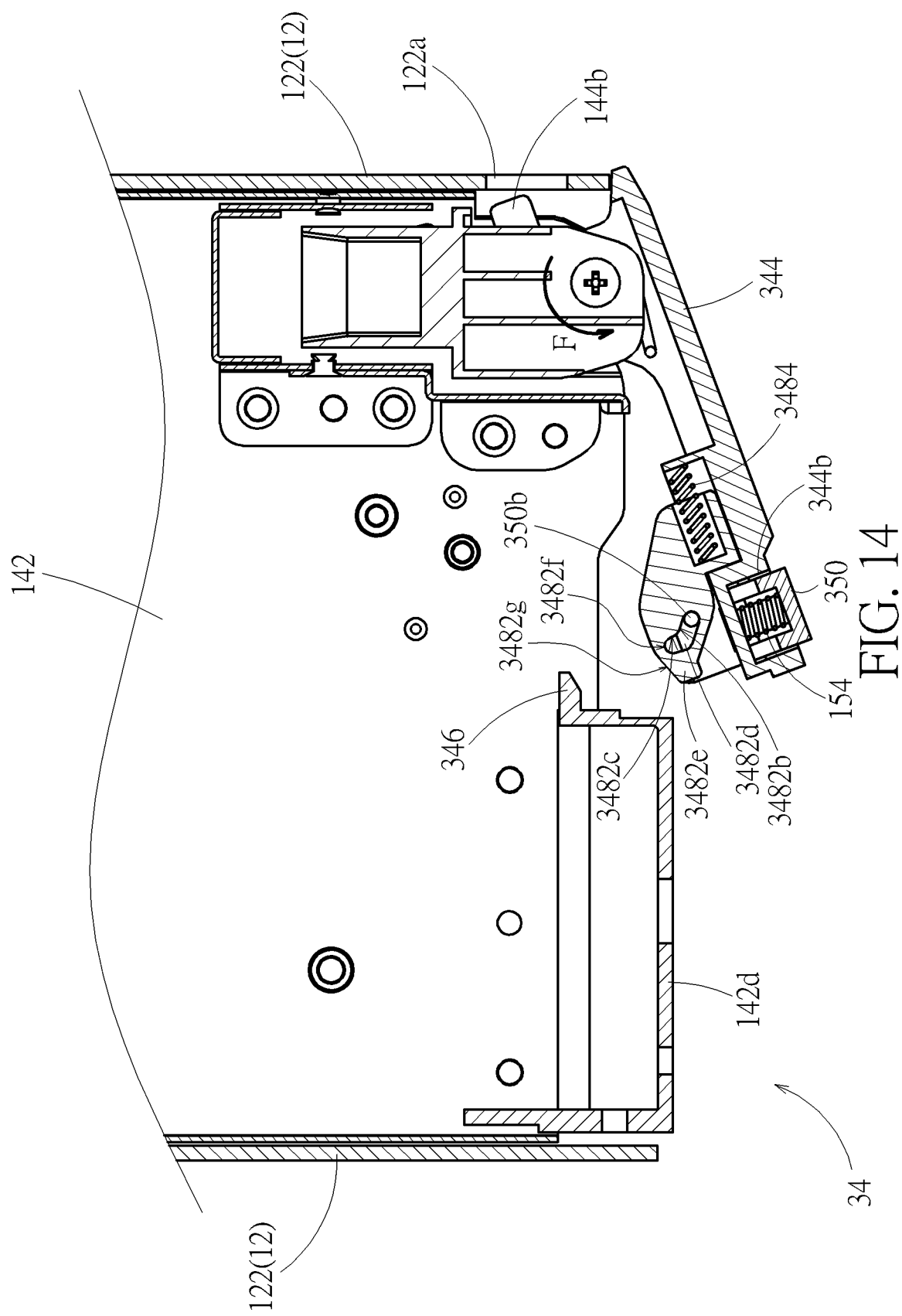
FIG. 14 is a sectional view of the button in FIG. 13 after released.

In the embodiment, the first holding structure 346 is a hooked structure, extending from a side of the cage body 142 and protruding toward the second holding portion 3482. The second holding portion 3482 has a latch portion 3482e. The first holding structure 346 and the second holding structure 348 are detachably engaged with each other by the hooked structure hooking the latch portion 3482e. When the detachable cage 34 is supported on the bracket 122 (referring to FIG. 1) and the first holding structure 346 and the second holding structure 348 are engaged with each other, the user can press the button 350 to slide parallel to the button sliding direction 350a and slidably pushes against the first surface 3482b through the abutting portion 350b, so as to move the second holding portion 3482 parallel to the extension direction D2 of the guiding sliding slot 344a until the latch portion 3482e of the second holding portion 3482 is disengaged from the first holding structure 346, as shown by FIG. 12. When the abutting portion 350b slides onto the second surface 3482c, under the effect of the pushing force F (produced by the force generating structure 152), the handle 344 together with the second holding portion 3482 rotate relative to the button 350 (counterclockwise rotating relative to the cage body 142) and the abutting portion 350b slides on the second surface 3482c, until the abutting portion 350b blocks an end 3482f of the sliding slot 3482d, as shown by FIG. 13. At the moment, the handle 344 and the second holding portion 3482 together are rotated an angle relative to the cage body 142, so even under the effect of the second holding portion restoring structure 3484, the latch portion 3482e will not be engaged with the first holding structure 346 again. Afterward, after the user removes his finger from the button 150, the button restoring structure 154 will drive the button 350 to return back to its original position, and the second holding portion restoring structure 3484 will drive the second holding portion 3482 to return back to its original position. Then, the handle 344 can easily be rotated away from the cage body 142 for the user to grasp, as shown by FIG. 14.

Therein, in actual operation, the finger is usually larger than the button 350, so when the abutting portion 350b slides onto the second surface 3482c so that the handle 344 rotates relative to the button 350, the finger itself that presses the button 350 can play the role of stopping the handle 344 from continuing rotating. In this case, the above design of using the abutting portion 350b to block the end 3482f of the sliding slot 3482d to stop the handle 344 from continuing rotating can be omitted. Furthermore, in the embodiment, the button restoring structure 154 is a spiral spring, which can be regarded as a rigid body when fully compressed to solid (as shown by FIG. 13). The button 350 also can use the compressed button restoring structure 154 to stop the handle 344 from continuing rotating. Similarly, in this case, the above design of using the abutting portion 350b to block the end 3482f of the sliding slot 3482d to stop the handle 344 from continuing rotating can be omitted.

Furthermore, in the embodiment, the second holding portion 3482 has a guiding surface 3482g, which is oblique to the extension direction D2 of the guiding sliding slot 344a, so that when the handle 344 is rotated toward the cage body 142 (e.g. by the user pressing the handle 144 back toward the cage body 142), the first holding structure 346 can slide on the guiding surface 3482g to make the second holding portion 3482 slides parallel to the extension direction D2 to cross over the latch portion 3482e. Afterward, under the restoring effect of the second holding portion restoring structure 3484, the second holding portion 3482 and the first holding structure 346 engage with each other again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detachable cage, comprising:
   a cage body;
   a handle, pivotally connected to the cage body;
   a first holding structure, disposed on the cage body;
   a second holding structure, disposed on the handle, the second holding structure comprising a second holding portion and being detachably engaged with the first holding structure through the second holding portion, the second holding portion being slidably disposed on the handle; and
   a button, movably disposed on the handle, the button comprising an abutting portion sliding on the second holding portion, the button being operable to be pressed to push against the second holding structure through the abutting portion to disengage the first holding structure and the second holding structure from each other, so as to allow the handle to rotate outward relative to the cage body;
   wherein the second holding portion has a first surface and a second surface connected to the first surface, the button is slidably disposed on the handle in a button sliding direction, the button sliding direction and an extension direction of the first surface form an acute angle, the button sliding direction is parallel to an extension direction of the second surface, and the abutting portion slides on the first surface or the second surface.

2. The detachable cage according to claim 1, wherein the second holding structure comprises a second holding portion restoring structure, and the second holding portion restoring structure is disposed to drive the second holding portion to return to an original position of the second holding portion.

3. The detachable cage according to claim 2, wherein the second holding portion has a sliding slot, the sliding slot forms the first surface and the second surface, and the abutting portion is slidably disposed in the sliding slot.

4. The detachable cage according to claim 2, wherein the first holding structure is fixedly disposed on the cage body, and the first holding structure is a hooked structure, protruding from a side of the cage body toward the second holding portion.

5. The detachable cage according to claim 1, further comprising a button restoring structure, connected to the button and the handle.

6. The detachable cage according to claim 1, further comprising a force generating structure, disposed to apply a pushing force to the handle to drive the handle to rotate outward relative to the cage body, wherein when the first holding structure and the second holding structure are disengaged from each other, the handle rotates outward relative to the cage body under the pushing force.

7. An electronic apparatus casing, comprising:
a casing frame, having a bracket; and
a detachable cage, comprising:
   a cage body, detachably disposed on the bracket;
   a handle, pivotally connected to the cage body;
   a first holding structure, disposed on the cage body;
   a second holding structure, disposed on the handle, the second holding structure comprising a second holding portion and being detachably engaged with the first holding structure through the second holding portion, the second holding portion being slidably disposed on the handle; and
   a button, movably disposed on the handle, the button comprising an abutting portion sliding on the second holding portion, the button being operable to be pressed to push against the second holding structure through the abutting portion to disengage the first holding structure and the second holding structure from each other, so as to allow the handle to rotate outward relative to the cage body;
   wherein the second holding portion has a first surface and a second surface connected to the first surface, the button is slidably disposed on the handle in a button sliding direction, the button sliding direction and an extension direction of the first surface form an acute angle, the button sliding direction is parallel to an extension direction of the second surface, and the abutting portion slides against the first surface or the second surface.

8. The electronic apparatus casing according to claim 7, wherein the second holding structure comprises a second holding portion restoring structure, and the second holding portion restoring structure is disposed to drive the second holding portion to return to an original position of the second holding portion.

9. The electronic apparatus casing according to claim 8, wherein the second holding portion has a sliding slot, the sliding slot forms the first surface and the second surface, and the abutting portion is slidably disposed in the sliding slot.

10. The electronic apparatus casing according to claim 8, wherein the first holding structure is fixedly disposed on the cage body, and the first holding structure is a hooked structure, protruding from a side of the cage body toward the second holding portion.

11. The electronic apparatus casing according to claim 7, wherein the detachable cage further comprises a button restoring structure, connected to the button and the handle.

12. The electronic apparatus casing according to claim 7, wherein the detachable cage further comprises a force generating structure, disposed to apply a pushing force to the handle to drive the handle to rotate outward relative to the cage body, and when the first holding structure and the second holding structure are disengaged from each other, the handle rotates outward relative to the cage body under the pushing force.

13. The electronic apparatus casing according to claim 7, wherein the bracket has a lock slot, the handle of the detachable cage has a latch, when the detachable cage is supported on the bracket and the first holding structure and the second holding structure are engaged with each other, the latch protrudes from the cage body and is inserted into the lock slot so as to prevent the cage body from departing from the bracket, and when the first holding structure and the second holding structure are disengaged from each other, the latch does not protrude from the cage body.

* * * * *